(12) United States Patent
Choi et al.

(10) Patent No.: US 8,398,113 B2
(45) Date of Patent: Mar. 19, 2013

(54) KNEE AIR BAG FOR VEHICLE

(75) Inventors: Jun Yeol Choi, Seoul (KR); Wan Dong Yoo, Suwon-si (KR); Do Gwan Kim, Osan-si (KR)

(73) Assignees: Hyundai Motor Company, Seoul (KR); Kia Motors Corp., Seoul (KR); Autoliv Development AB, Vargarda (SE)

( * ) Notice: Subject to any disclaimer, the term of this patent is extended or adjusted under 35 U.S.C. 154(b) by 0 days.

(21) Appl. No.: 13/169,351

(22) Filed: Jun. 27, 2011

(65) Prior Publication Data

US 2012/0126516 A1  May 24, 2012

(30) Foreign Application Priority Data

Nov. 23, 2010 (KR) .................. 10-2010-0116687

(51) Int. Cl.
*B60R 21/16* (2006.01)
(52) U.S. Cl. .................................................. 280/730.1
(58) Field of Classification Search .............. 280/730.1, 280/736, 740, 743.2
See application file for complete search history.

(56) References Cited

U.S. PATENT DOCUMENTS

| | | | | |
|---|---|---|---|---|
| 3,243,822 A | * | 4/1966 | Lipkin ............................ 2/455 |
| 3,603,535 A | * | 9/1971 | DePolo ......................... 244/121 |
| 5,738,368 A | * | 4/1998 | Hammond et al. ......... 280/730.1 |
| 5,782,529 A | * | 7/1998 | Miller et al. ............. 297/216.13 |
| 6,557,887 B2 | * | 5/2003 | Wohllebe .................. 280/730.1 |
| 6,648,367 B2 | * | 11/2003 | Breed et al. ............... 280/730.1 |
| 8,096,578 B2 | * | 1/2012 | Wigger et al. ................ 280/732 |
| 2012/0091696 A1 | * | 4/2012 | Wigger et al. ............ 280/730.1 |

FOREIGN PATENT DOCUMENTS

JP    2003-182504 A    7/2003

* cited by examiner

*Primary Examiner* — Faye M. Fleming

(74) *Attorney, Agent, or Firm* — Morgan, Lewis & Bockius LLP

(57) ABSTRACT

A knee air bag for a vehicle has an inflator, a diffuser and a cushion to protect a passenger's knee when the cushion is deployed. The knee air bag also includes an inflator connector which is provided on a back of the cushion, and an external tether which is provided on an upper portion of the inflator connector and secured at lower and upper ends thereof to the back of the cushion, thus guiding the cushion so that the cushion is deployed upwards. The knee air bag makes the cushion come into close contact with a seatback of the vehicle when the knee air bag is deployed, thus reducing interference with a roof air bag located at an upper position, therefore preventing a passenger's head or neck from suffering secondary injuries.

10 Claims, 5 Drawing Sheets

KNEE AIR BAG FOR VEHICLE

CROSS-REFERENCE TO RELATED APPLICATIONS

The present application claims priority to Korean Patent Application No. 10-2010-0116687 filed on Nov. 23, 2010, the entire contents of which application is incorporated herein for all purposes by this reference.

BACKGROUND OF THE INVENTION

1. Field of the Invention

The present invention relates to a knee air bag for a vehicle, which is provided in front of a seat of the vehicle to be deployed in the event of a collision, thus protecting a passenger's knees.

2. Description of the Related Art

Recently, as the interest given to safety in the event of a vehicle collision has increased, a vehicle has been equipped with various air bags to effectively protect a passenger during the vehicle collision.

Among the air bags, as one example, a knee air bag has been proposed. However, the knee air bag has not been widely installed in vehicles, in comparison with other air bags.

Thus, recently, a lot of research into the knee air bag has been made, but there has not yet been proposed a knee air bag whose shape and structure are designed in consideration of relations between the knee air bag and other air bags.

The knee air bag is generally deployed around the lower part of a passenger's body to protect his or her knees in the event of a collision. The upper part of the passenger's body is protected by a center air bag or a roof air bag. Thus, in order to reliably protect the upper part of the passenger's body and his or her knees, the layout of the knee air bag with respect to the roof air bag or the like when the knee air bag is deployed must be considered.

For example, referring to FIGS. 1 and 2, as for the rear seat of a vehicle, in the event of a collision, a roof air bag 10 is deployed to protect the head and chest of a passenger P, while a knee air bag 30 is deployed at a lower position to protect the knees of the passenger P. However, the two air bags are simultaneously deployed, so that the upper end of the knee air bag 30 is pressed against the lower end of the roof air bag 10, and thus the roof air bag 10 may excessively protrude towards the passenger P. This causes the twisting of his or her neck, thus undesirably increasing secondary injuries.

Such an increase in secondary injuries occurs for the following reason. That is, when the knee air bag 30 is deployed, an inflator explodes and simultaneously a cushion of the air bag is excessively deployed towards the passenger P, so that the roof air bag 10 located at an upper position is pushed by the knee air bag 30 and is excessively deployed towards the passenger P. Thus, when the knee air bag 30 is applied in the same manner as the conventional air bag, it has a problem in that secondary injuries increase. Therefore, there is required a knee air bag having an optimum shape and structure which can reduce the injuries and minimize interference with another bag to allow the two air bags to sufficiently display their effects.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art, and an object of the present invention is to provide a knee air bag for a vehicle, which avoids interference with a roof air bag when the knee air bag is deployed, thus preventing a passenger from being secondarily injured by the air bag.

Another object of the present invention is to provide a knee air bag for a vehicle, which is deployed as rapidly as possible and reliably maintains its deployed shape.

In order to achieve the above objects, according to one aspect of the present invention, there is provided a knee air bag for a vehicle having an inflator, a diffuser and a cushion to protect a passenger's knee when the cushion is deployed. The knee air bag includes an inflator connector which is provided on a back of the cushion, and an external tether which is provided on an upper portion of the inflator connector and secured at lower and upper ends thereof to the back of the cushion, thus guiding the cushion so that the cushion is deployed upwards.

The external tether may have a shape of a band of a predetermined width, and a length between the upper and lower ends of the external tether secured to the cushion may be formed to be shorter than a length of an associated portion of the cushion, so that, when the cushion is deployed, the cushion is pulled in a direction opposite to a passenger.

The lower end of the external tether may be secured to a position adjacent to the inflator connector of the cushion, and the upper end of the external tether may be secured to an upper end or an upper portion of a front of the cushion.

The cushion may be formed such that a width thereof is reduced in a direction from a lower end to an upper end thereof.

An upper portion of the cushion may have a trapezoidal shape, and a lower portion of the cushion may have a rectangular shape, so that the cushion may have an overall hexagonal shape.

The diffuser may be provided in the cushion to be connected to the inflator, and may have a shape of a chamber which has a closed curved surface independent of the cushion, with a plurality of vent holes formed along a circumference of the chamber.

The knee air bag may further include a vertical tether which is provided on a side of the diffuser in such a way as to be placed vertically and connects the front and the back of the cushion to each other in the cushion.

The knee air bag may further include a horizontal tether which is provided on an upper portion of the diffuser in such a way as to be placed horizontally and connects the front and the back of the cushion to each other in the cushion, a rear end of the horizontal tether which is connected to the back of the cushion being connected to the upper end of the external tether.

The diffuser may be provided in the cushion to be connected to the inflator, may have a shape of an inverted "Y", and may include an upper vent part which extends vertically and a pair of lower vent parts which extend diagonally.

The knee air bag may further include a vertical tether which is provided on a side of the upper vent part of the diffuser in such a way as to be placed vertically and connects the front and the back of the cushion to each other in the cushion.

The knee air bag may further include a horizontal tether which is placed horizontally between the lower vent parts provided on both sides of the diffuser and connects the front and the back of the cushion to each other in the cushion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
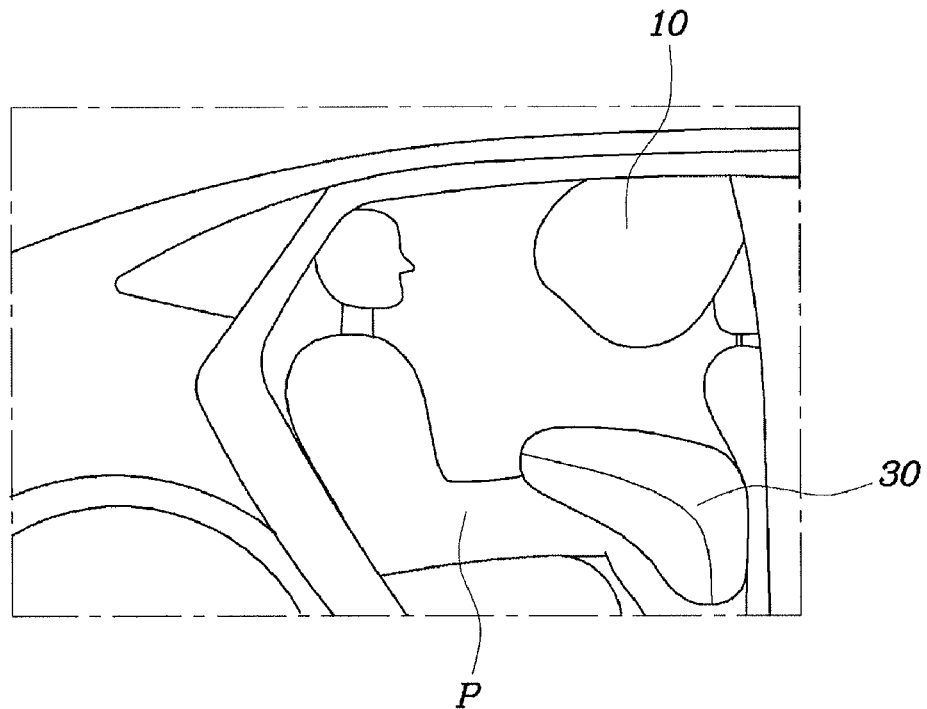
FIG. 1 is a view showing an initial deployment stage of a conventional knee air bag for a vehicle.
Figure 2:
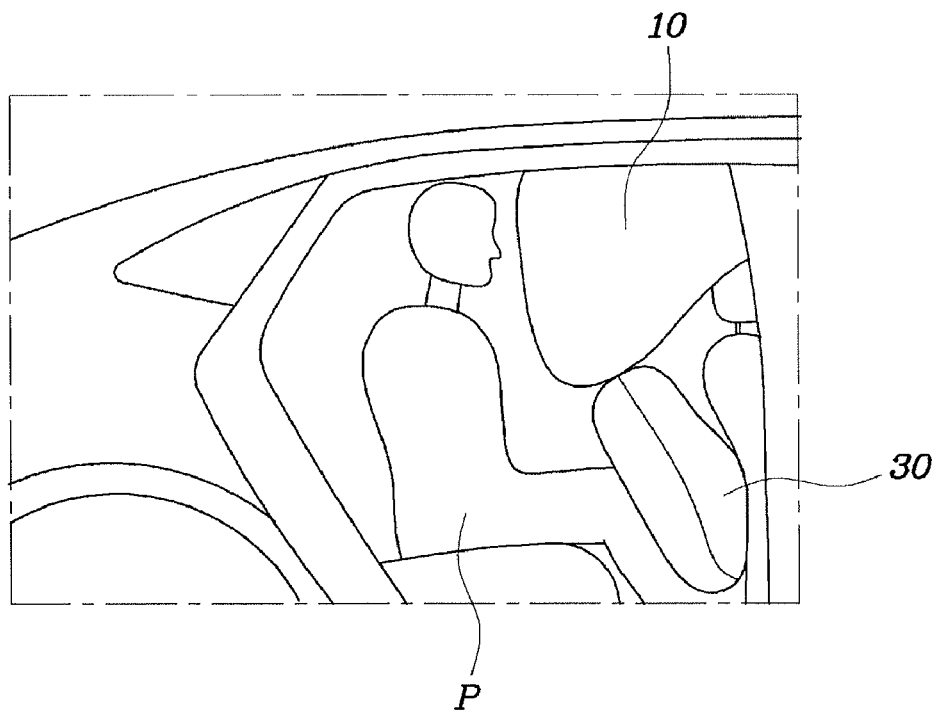
FIG. 2 is a view showing a latter deployment stage of the knee air bag for the vehicle of FIG. 1.
Figure 3:
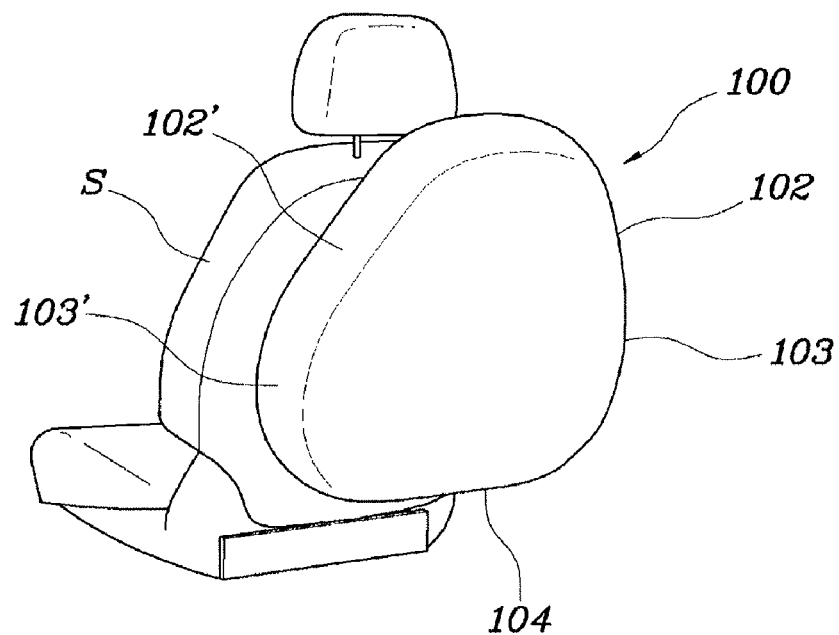
FIG. 3 is a perspective view showing an exemplary deployed knee air bag for a vehicle according to the present invention.
Figure 4:
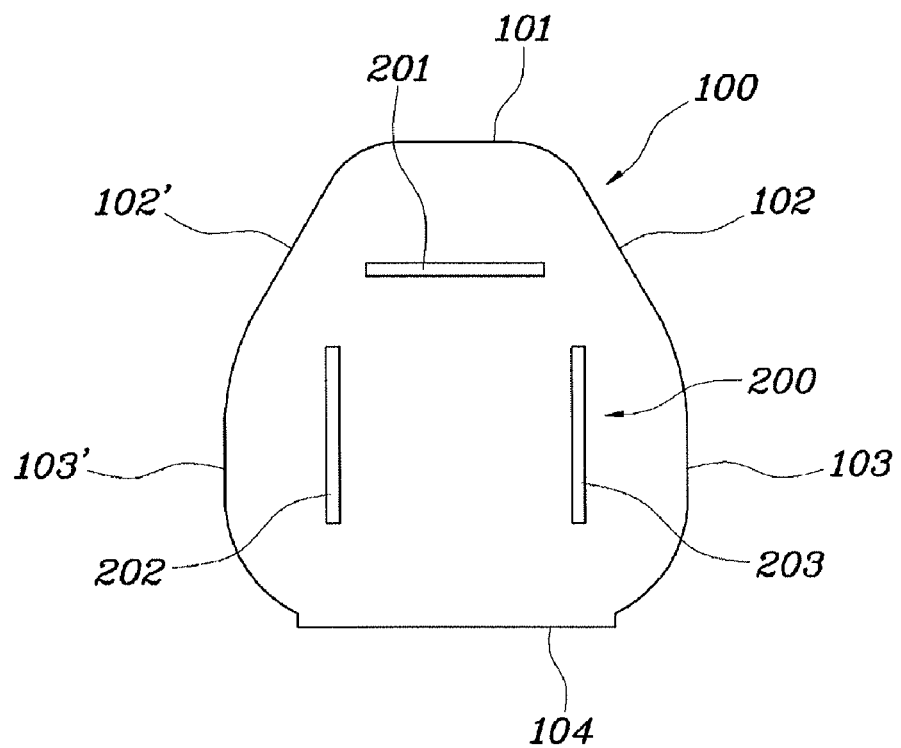
FIG. 4 is a front view showing the knee air bag for the vehicle of FIG. 3.
Figure 5:
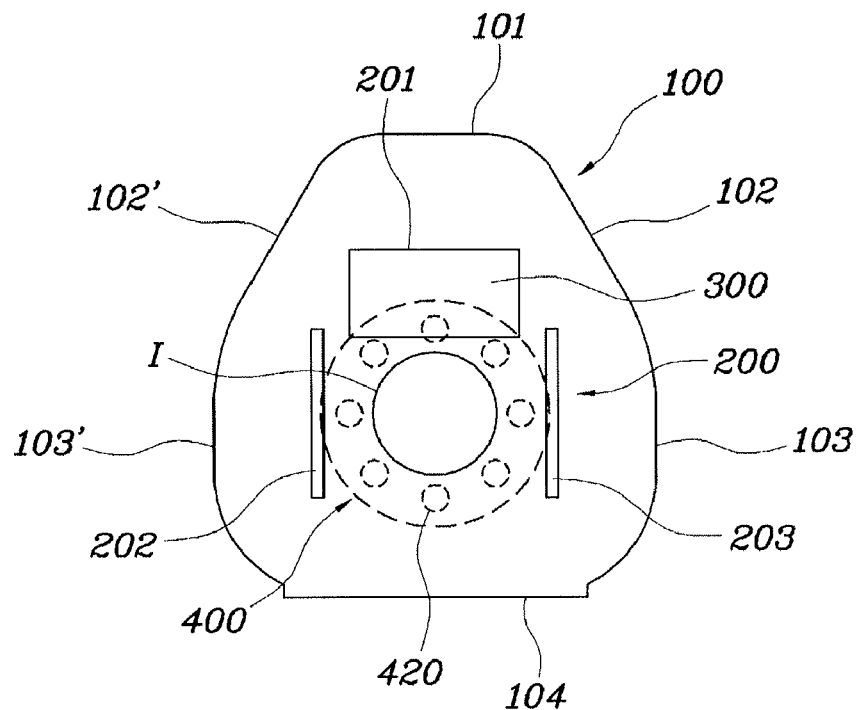
FIG. 5 is a rear view showing the knee air bag for the vehicle of FIG. 3.
Figure 6:
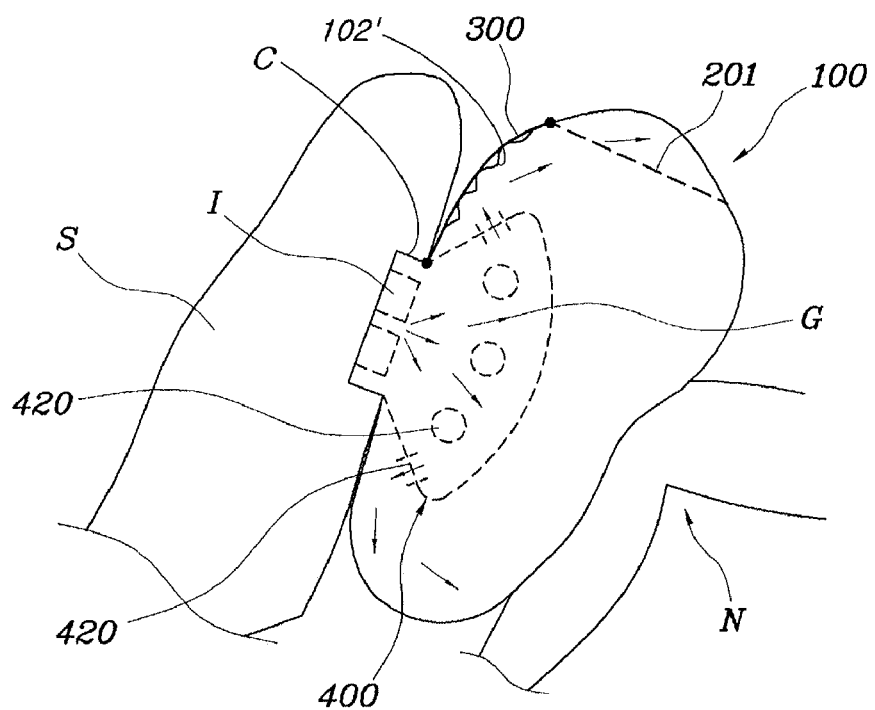
FIG. 6 is a side view showing the knee air bag for the vehicle of FIG. 3.

FIG. 3 is a perspective view showing a deployed knee air bag for a vehicle according to various embodiments of the present invention, FIG. 4 is a front view showing the knee air bag for the vehicle of FIG. 3, FIG. 5 is a rear view showing the knee air bag for the vehicle of FIG. 3, and FIG. 6 is a side view showing the knee air bag for the vehicle of FIG. 3.

The knee air bag for the vehicle according to various embodiments of the present invention includes an inflator I, a diffuser 400 and a cushion 100, and functions to protect a passenger's knees when the cushion 100 is deployed. The knee air bag includes an inflator connector C which is provided on the back of the cushion 100, and an external tether 300 which is provided on the upper portion of the inflator connector and is secured at lower and upper ends thereof to the back of the cushion 100 to upwardly guide the deployment of the cushion 100.

The knee air bag for the vehicle may be provided for passengers sitting in front and rear seats of the vehicle. The following will be described with reference to the case wherein the knee air bag is provided for a passenger sitting in the rear seat.

The knee air bag for the vehicle includes the inflator I, the diffuser 400, the cushion 100 and the external tether 300 attached to the cushion 100. They form one module and may be provided on a seatback S of the front seat of the vehicle. In the event of a collision, the cushion 100 may be deployed upwards along the seatback S by the explosion of the inflator I.

The cushion 100 is fitted with the external tether 300. The external tether 300 is provided above a portion of the cushion 100 to which the inflator I is connected, and is secured at each of the lower and upper ends to the back of the cushion 100, thus upwardly guiding the deployment of the cushion 100. The external tether 300 prevents the cushion 100 of the air bag from being deployed directly from the seatback S to a passenger, but allows the cushion 100 to be deployed upwards along the seatback S. Thus, the knee air bag does not interfere with the lower end of the roof air bag 10 which is located at an upper position, thus preventing secondary injuries, that is, the twisting of a passenger's neck or head.

Meanwhile, the external tether 300 has the shape of a band having a predetermined width, and is formed such that a length between the upper and lower ends of the external tether 300 secured to the cushion 100 is shorter than a length of an associated portion of the cushion 100, and thus the cushion 100 is pulled in a direction opposite to a passenger when the cushion 100 is deployed.

The external tether 300, which has the shape of a band having a predetermined width, may be made of the same material as the cushion 100 of the air bag, and may be formed to be shorter than the entire length of a portion of the cushion 100 to which the external tether 300 is attached, so as to maintain an effective pulling force. That is, the external tether 300 is secured at the upper and lower ends thereof to the back of the cushion 100. By making the length of a portion of the cushion 100 to which the external tether 300 is attached be longer than a length between the upper and lower ends of the external tether 300, the external tether 300 may sufficiently pull the cushion 100 in response to the expansive force of the cushion 100. Since the external tether 300 has the above-mentioned shape, the cushion 100 is wrinkled at a position to which the external tether 300 is attached, when the cushion 100 is deployed (see FIG. 6).

Further, the lower end of the external tether 300 may be secured to a position adjacent to the inflator connector of the cushion 100, while the upper end of the external tether 300 may be secured to the upper end or the upper portion of the front of the cushion 100.

That is, the lower end of the external tether 300 may be secured to a position adjacent to the inflator connector of the cushion 100, and the securing position of the upper end may be changed to the upper end or the upper portion of the front of the cushion 100, depending on the amount of pulling force that is set.

The width of such a cushion 100 may be formed such that it is reduced in a direction from a lower end to an upper end thereof. Since the cushion 100 is not shaped into a general rectangle but is shaped to become narrow towards the upper end, the unnecessary space of the cushion 100 is reduced, and thereby a proper expansive force of the cushion 100 is attained. The reason for this is because the explosive force of gas supplied from the inflator I is restrictive and a sufficient space is required for only a portion making contact with a passenger's knees N in the case of the knee air bag. Further, since the volume of the cushion 100 is reduced in a direction from the lower end to the upper end thereof, a larger deploying force is attained in an upward direction. Owing to rapid upward deployment, the knee air bag does not collide with the lower end of the roof air bag 10 but is in close contact with the seatback S of the vehicle.

The upper portion of the cushion 100 may have a trapezoidal shape and the lower portion of the cushion 100 may have a rectangular shape, so that the cushion 100 has a hexagonal shape overall. Such a shape was determined based on an experiment. This shape enables the air bag cushion 100 to have a top 101, a pair of upper side surfaces 102 and 102', a pair of lower side surfaces 103 and 103', and a bottom 104.

Meanwhile, the diffuser 400 is provided in the cushion 100 in such a way as to be connected to the inflator I, and has the shape of a chamber which has a closed curved surface independent of the cushion 100. The diffuser 400 includes a plurality of vent holes 420 which are formed along the circumference of the chamber.

The construction of the diffuser 400 shaped in this way is novel. The diffuser 400 has the shape of the closed curved surface defining an independent chamber in the air bag cushion 100, and includes the vent holes 420 formed along the circumference of the chamber, thus allowing gas G to be evenly distributed in the cushion 100. Further, the diffuser 400 prevents high-temperature and high-pressure gas of the inflator I from being directly jetted to the cushion 100, thus improving the durability of the air bag cushion 100. Thus, the gas G of the inflator I is first supplied to the diffuser 400. While the diffuser 400 is expanding, the gas is jetted through the vent holes 420 in all directions, thus resulting in the inflation of the air bag cushion 100.

Meanwhile, the knee air bag may further include a vertical tether 202 and a horizontal tether 201. The vertical tether 202 is vertically installed on a side of the diffuser 400 to connect the front and back of the cushion 100 to each other in the cushion 100. The horizontal tether 201 is horizontally installed at an upper position of the diffuser 400 to connect the front and back of the cushion 100 to each other in the cushion 100. The rear end of the horizontal tether 201 connected to the back of the cushion 100 is connected to the upper end of the external tether 300.

As shown in FIG. 4, a pair of vertical tethers 202 and 203 may be provided on opposite sides of the cushion 100 along the circumference of the circular diffuser 400, and one horizontal tether 201 may be provided on the upper portion of the diffuser 400. These internal tethers 200 connect the front and back of the cushion 100 to each other in the cushion 100, thus limiting the inflation of the cushion 100 so that the thickness of the cushion is constant when the cushion 100 is inflated. Further, the horizontal tether 201 is provided on the upper portion of the diffuser 400 to allow the gas G jetted through the diffuser 400 to sufficiently flow to a lower position, thus allowing a portion of the cushion 100 making contact with a passenger's knees N to rapidly inflate. Meanwhile, the upper portion of the cushion 100 is filled with gas which is discharged through gaps between the internal tethers 200. Since the width of the upper portion of the cushion 100 is gradually reduced, it can be seen that a sufficient deploying speed is achieved even at the upper portion.

Further, as shown in FIGS. 5 and 6, the rear end of the horizontal tether 201 attached to the back of the cushion 100 is connected to the upper end of the external tether 300, so that the external tether 300 pulls the front of the cushion 100 as well as the back of the cushion 100, thus allowing the upper portion of the cushion 100 to be in strong and close contact with the seatback S.

Figure 7:
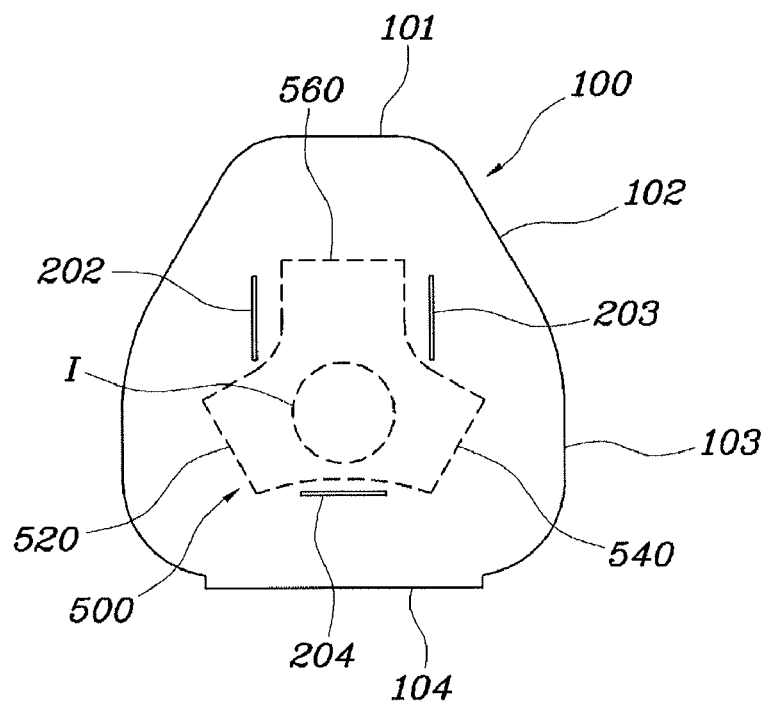
FIG. 7 is a rear view showing an exemplary knee air bag for a vehicle according to the present invention.

Meanwhile, FIG. 7 shows a cushion having a diffuser according to various embodiments of the present invention. The following diffuser is denoted by reference numeral 500 so as to be distinguished from the above embodiment. One will appreciate, however, that various aspects of the following diffuser may be similar to that described above.

The diffuser 500 is provided in the cushion 100 to be connected to the inflator I, and has the shape of an inverted "Y". The diffuser 500 includes an upper vent part 560 which extends vertically, and a pair of lower vent parts 520 and 540 which extend diagonally. Further, the knee air bag includes vertical tethers 202 and 203 which are vertically placed on opposite sides of the upper vent part 560 of the diffuser 500 to connect the front and back of the cushion 100 to each other in the cushion 100, and a horizontal tether 204 which is horizontally placed between the lower vent parts 520 and 540 provided on both sides of the diffuser 500 and connects the front and back of the cushion 100 to each other in the cushion 100.

Such a diffuser 500 has the shape of an inverted "Y", and includes the upper vent part 560 and the pair of lower vent parts 520 and 540. The lower vent parts 520 and 540 jet gas downwards in a diagonal direction, thus promoting the inflation of the lower portion of the cushion 100, therefore allowing a passenger's knees to be sufficiently protected. Further, the upper vent part 560 vertically jets gas, thus allowing the upper portion of the cushion 100 to be rapidly inflated.

Meanwhile, the horizontal tether 204 is horizontally provided between both the lower vent parts 520 and 540, so that it controls the thickness of the cushion 100 and does not hinder the gas jetting operation of the upper vent part 560.

Figure 8:
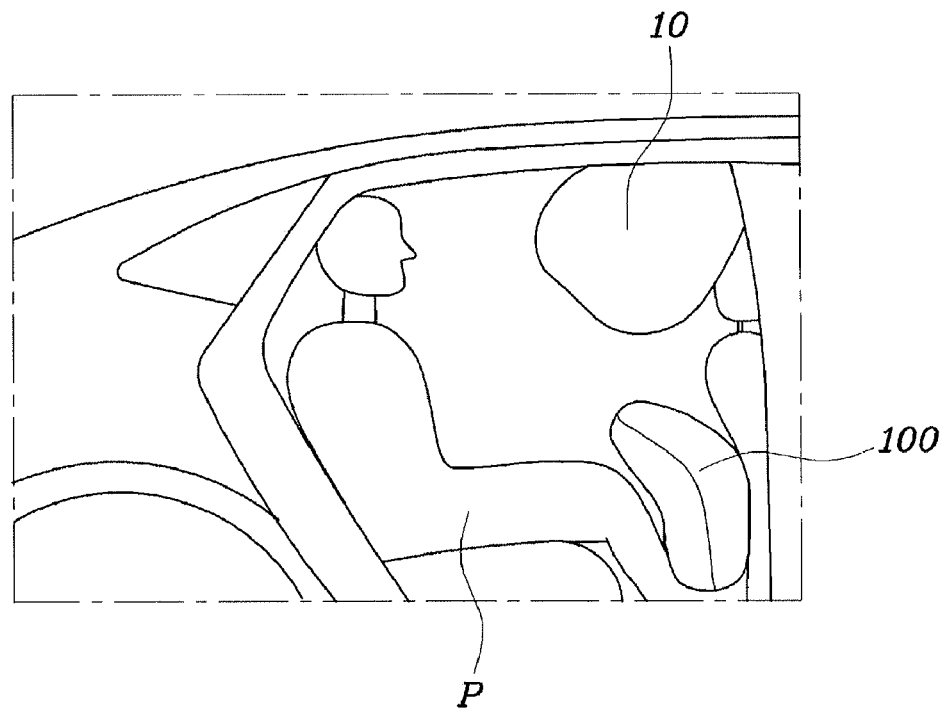
FIG. 8 is a view showing an initial deployment stage of the knee air bag for the vehicle of FIG. 3.
Figure 9:
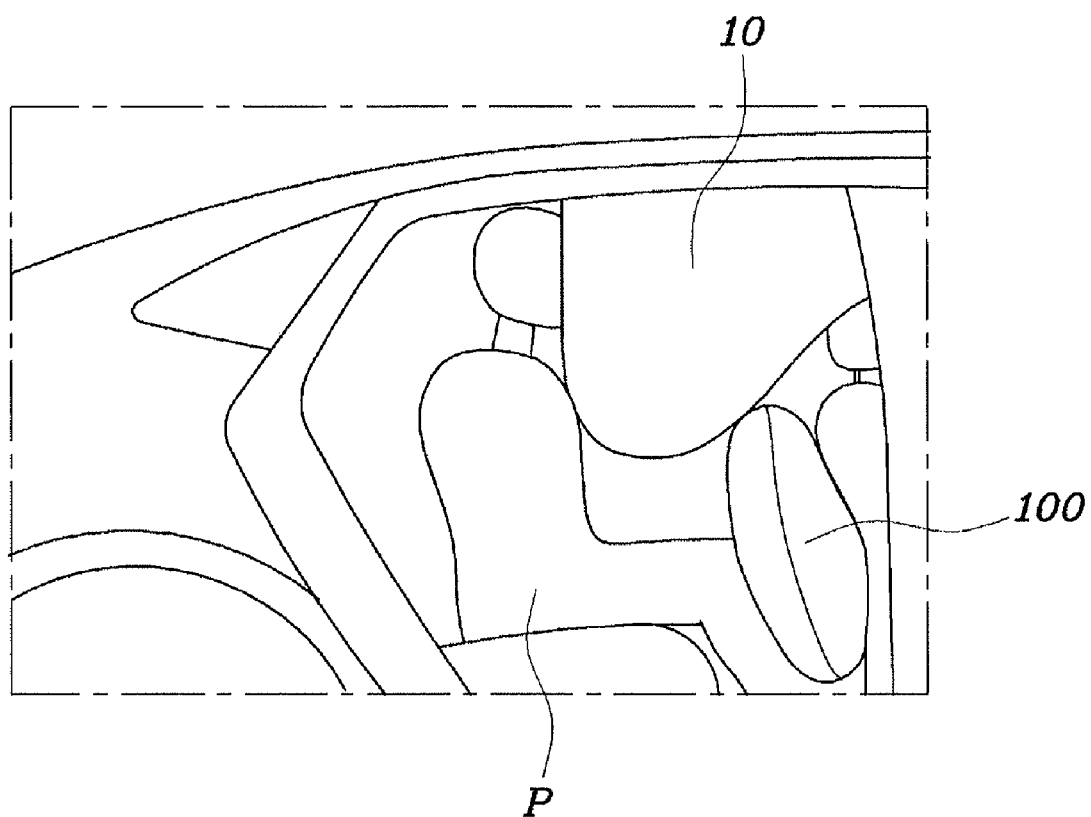
FIG. 9 is a view showing a latter deployment stage of the knee air bag for the vehicle of FIG. 3.

FIG. 8 is a view showing an initial deployment stage of the knee air bag for the vehicle of FIG. 3, and FIG. 9 is a view showing a latter deployment stage of the knee air bag for the vehicle of FIG. 3.

Referring to the drawings, in the event of a collision, the cushion 100 of the knee air bag is not deployed towards a passenger as in the prior art, but is deployed upwards along the seatback. Thereby, the lower end of the roof air bag 10 located at an upper position does not collide with the upper end of the knee air bag, but is deployed in such a way as to cover the upper end of the knee air bag cushion 100, thus preventing the roof air bag 10 from excessively protruding towards the head of a passenger P, therefore preventing the passenger P from suffering secondary injuries.

As described above, the present invention provides a knee air bag for a vehicle, which makes a cushion come into close contact with a seatback of the vehicle when the knee air bag is deployed, thus reducing interference with a roof air bag located at an upper position, therefore preventing a passenger's head or neck from suffering secondary injuries.

Further, the present invention includes a novel cushion shape, tether structure and diffuser construction, which allow the knee air bag to be deployed within a sufficiently short period of time.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A knee air bag for a vehicle having an inflator, a diffuser and an inflatable cushion to protect a passenger's knee when the cushion is deployed, the knee air bag comprising:
   an inflator connector provided on a back of the cushion; and
   an external tether provided on an upper portion of the inflator connector, and secured at lower and upper ends thereof to the back of the cushion, thus guiding the cushion so that the cushion is deployed upwards;
   wherein the diffuser is provided in the cushion to be connected to the inflator, has a shape of an inverted "Y", and comprises an upper vent part which extends vertically and a pair of lower vent parts which extend diagonally.

2. The knee air bag as set forth in claim 1, wherein the external tether is a band having a predetermined width, and a length between the upper and lower ends of the external tether secured to the cushion is shorter than a length of an associated portion of the cushion, so that, when the cushion is deployed, the cushion is pulled in a direction opposite to a passenger.

3. The knee air bag as set forth in claim 1, wherein the lower end of the external tether is secured to a position adjacent to the inflator connector of the cushion, and the upper end of the external tether is secured to an upper end or an upper portion of a front of the cushion.

4. The knee air bag as set forth in claim 1, wherein the cushion is formed such that a width thereof is reduced in a direction from a lower end to an upper end thereof.

5. The knee air bag as set forth in claim 4, wherein an upper portion of the cushion has a trapezoidal shape, and a lower portion of the cushion has a rectangular shape, so that the cushion has an overall hexagonal shape.

6. The knee air bag as set forth in claim 1, wherein the diffuser is provided in the cushion to be connected to the inflator, and has a shape of a chamber which has a closed curved surface independent of the cushion, with a plurality of vent holes formed along a circumference of the chamber.

7. The knee air bag as set forth in claim 6, further comprising:
   a vertical tether provided on a side of the diffuser in such a way as to be placed vertically, and connecting the front and the back of the cushion to each other in the cushion.

8. The knee air bag as set forth in claim 6, further comprising:
   a horizontal tether provided on an upper portion of the diffuser in such a way as to be placed horizontally, and connecting the front and the back of the cushion to each other in the cushion, a rear end of the horizontal tether which is connected to the back of the cushion being connected to the upper end of the external tether.

9. The knee air bag as set forth in claim 1, further comprising:
   a vertical tether provided on a side of the upper vent part of the diffuser in such a way as to be placed vertically, and connecting the front and the back of the cushion to each other in the cushion.

10. The knee air bag as set forth in claim 1, further comprising:
    a horizontal tether placed horizontally between the lower vent parts provided on both sides of the diffuser, and connecting the front and the back of the cushion to each other in the cushion.

\* \* \* \* \*